US010148875B1

(12) United States Patent
Chen

(10) Patent No.: US 10,148,875 B1
(45) Date of Patent: Dec. 4, 2018

(54) METHOD AND SYSTEM FOR INTERFACING MULTIPLE CHANNELS OF PANORAMIC VIDEOS WITH A HIGH-DEFINITION PORT OF A PROCESSOR

(71) Applicant: Scott Zhihao Chen, Irvine, CA (US)

(72) Inventor: Scott Zhihao Chen, Irvine, CA (US)

( * ) Notice: Subject to any disclaimer, the term of this patent is extended or adjusted under 35 U.S.C. 154(b) by 274 days.

(21) Appl. No.: 15/156,611

(22) Filed: May 17, 2016

(51) Int. Cl.
| | |
|---|---|
| H04N 21/63 | (2011.01) |
| B60R 11/04 | (2006.01) |
| H04N 5/232 | (2006.01) |
| H04N 7/015 | (2006.01) |
| H04N 5/265 | (2006.01) |
| H04N 21/637 | (2011.01) |

(52) U.S. Cl.
CPC ......... *H04N 5/23238* (2013.01); *B60R 11/04* (2013.01); *H04N 5/265* (2013.01); *H04N 7/015* (2013.01); *H04N 21/63* (2013.01); *H04N 21/631* (2013.01); *H04N 21/637* (2013.01)

(58) Field of Classification Search
CPC .................................. G06T 3/00; H04N 21/63
See application file for complete search history.

(56) References Cited

U.S. PATENT DOCUMENTS

| | | | | |
|---|---|---|---|---|
| 9,071,752 B2 * | 6/2015 | Kuo | ................... | H04N 5/23238 |
| 9,894,422 B2 * | 2/2018 | Hwang | ............ | H04N 21/23614 |
| 9,908,482 B1 * | 3/2018 | Falstrup | ................... | B60R 11/04 |
| 2010/0097443 A1 * | 4/2010 | Lablans | ................. | G03B 37/00 |
| | | | | 348/36 |
| 2012/0099655 A1 * | 4/2012 | Niemi | ..................... | H04N 19/93 |
| | | | | 375/240.23 |
| 2012/0105578 A1 * | 5/2012 | Ohmiya | ............. | H04N 5/23238 |
| | | | | 348/36 |
| 2014/0215547 A1 * | 7/2014 | Lee | ...................... | H04N 21/631 |
| | | | | 725/126 |
| 2016/0307350 A1 * | 10/2016 | Huang | ................. | G06K 9/4671 |

OTHER PUBLICATIONS

Overview of the multiview and 3D extensions of the High efficiency video coding; Gerhard; 2016.*
Google Patent Search for NPL.*

* cited by examiner

*Primary Examiner* — Luis Perez-Fuentes

(57) ABSTRACT

Panoramic imaging systems and process for multiplexing a set of video signal inputs captured by a set of cameras in a panoramic imaging system into a single video signal output is disclosed. In some embodiments, the disclosed process receives a set of input image frames associated with the set of video signal inputs and temporarily stores the set of input image frames in a memory. Next, for each pair of image frames in the set of input image frames, the process iteratively processes each line in the pair of image frames to construct a portion of a video signal output frame. The process then combines portions of the video signal output frame to form a single composite output frame containing the image data of the set of input image frames.

15 Claims, 8 Drawing Sheets

METHOD AND SYSTEM FOR INTERFACING MULTIPLE CHANNELS OF PANORAMIC VIDEOS WITH A HIGH-DEFINITION PORT OF A PROCESSOR

TECHNICAL FIELD

The present disclosure generally relates to the field of panoramic imaging, and more specifically to systems and techniques for interfacing a set of video signal inputs captured by a set of cameras in a panoramic imaging system with one or more video input ports of a downstream video image processor.

BACKGROUND

Panoramic photography, the taking of a photograph or photographs covering an elongated field of view, has a long history in photography. Perhaps the most primitive method of panoramic photography is the taking of several adjoining photos with a conventional camera and then mounting the prints together in alignment to achieve a complete panorama. Modern techniques adapt this method by using digital cameras to capture the images, and then using computer image processing techniques to align the images for printing as a single panorama.

The continuous development of digital camera technologies along with constantly increasing speed and processing power of computers have laid the foundation for digital imaging systems that are capable of acquiring image data for the automatic creation of wide to entire 360° panoramas, including both still panoramic images and dynamic panoramic movies.

Currently, main-stream panoramic imaging solutions can be generally categorized into the multi-lens approach and the single-lens approach. Multi-lens panoramic camera systems utilize a set of cameras for simultaneous image or video capturing. The cameras are typically arranged in either a parallel fashion or a converged fashion, such that each camera's field of view overlaps with that of at least one other camera. This way, the total field of view covered by the multi-camera systems is significantly enlarged as compared to a conventional single-lens camera. Hence, during panoramic video capturing, a multi-camera panoramic system generates multiple channels of simultaneous video signals, which are immediately output from the multiple cameras and transmitted to a processor, such as an accelerated processing unit (APU) of the multi-camera panoramic system for post-processing.

Typically, between the multiple output ports of the cameras and the input ports of the processor is a video input interface configured to provide proper matching between the data format of the raw video signals and input data format of the processor. When designing multi-channel video signal interfaces for a multi-camera panoramic system, a designer often has to deal with a limited number of available video input ports on the processor, such as an APU. Typically, an APU has only one or two video input ports. Thus, to accommodate multi-camera panoramic systems which can have for example, 4, 6, 8, 10, 12 or more output signal channels, it is necessary to expand the video input interface to accommodate the multiple channels of video signals. One existing solution to handle more output video channels than the input ports of the APU is by multiplexing. For example, some video decoders from Texas Instruments are designed to multiplex four video channels into a single video channel, thus offering a solution to aforementioned problem of the APU video input port shortage. However, existing systems can only support multiplexing four low-resolution video channels such as 720×576p, 720×480p resolutions into a single video input, but unable to process high-definition video signals at 1280×720p, 1920×1080p or other high resolutions. Unfortunately, there are no available off-the-shelf systems which offer the solution for multiplexing multiple channels of high-definition videos into a single input channel.

SUMMARY

Described herein are systems and techniques for multiplexing a set of video signal inputs captured by a set of cameras in a panoramic imaging system into a single video signal output which can be subsequently output to a single video input port of a downstream video image processor. The proposed systems and techniques provide a solution for interfacing multiple channels of high-definition videos captured by the set of cameras of the panoramic imaging system with a limited number of available video input ports of a downstream video image processor of the panoramic imaging system, such as an accelerated processing unit (APU) for post-processing.

In one aspect, a process of multiplexing a set of video signal inputs captured by a set of cameras in a panoramic imaging system into a single video signal output is disclosed. This process starts by receiving a set of input image frames associated with the set of video signal inputs and then temporarily storing the set of input image frames in a memory. Next, for a first pair of image frames in the set of input image frames, the process iteratively processes each line in the first pair of image frames to construct a first portion of a video signal output frame. Next, for a second pair of image frames in the set of input image frames, the process iteratively processes each line in the second pair of image frames to construct a second portion of the video signal output frame. The process then combines the first portion of the video signal output frame and the second portion of the video signal output frame to form a single composite output frame containing the image data of the set of input image frames.

In some implementations, the process iteratively processes each line in the first pair of image frames to construct the first portion of the video signal output frame by: reading a first line of image data of a first image frame of the first pair of image frames from the memory unit; outputting the read first line of image data of the first image frame to an output video buffer; reading a second line of image data of a second image frame of the first pair of image frames from the memory unit; outputting the read second line of image data of the second image frame to the output video buffer; and combining the read first line of image data with the read second line of image data in the video buffer to form one line of combined image data of the first portion of the video signal output frame.

In some implementations, the first line of image data and the second line of image data have the same line number in the respective first and second image frames.

In some implementations, the process iteratively processes each line in the second pair of image frames to construct the second portion of the video signal output frame by: reading a first line of image data of a third image frame of the second pair of image frames from the memory unit; outputting the read first line of image data of the third image frame to an output video buffer; reading a second line of image data of a fourth image frame of the second pair of image frames from the memory unit; outputting the read second line of image data of the fourth image frame to the output video buffer; and combining the read first line of image data with the read second line of image data in the video buffer to form one line of combined image data of the second portion of the video signal output frame.

In some implementations, the first line of image data and the second line of image data have the same line number in the respective third and fourth image frames.

In some implementations, the sizes of the first pair of image frames are $m_1 \times n$ and $m_2 \times n$, respectively, and the sizes of the second pair of image frames are $m_3 \times n$ and $m_4 \times n$, respectively, and wherein the size of the composite output frame is $(m_1+m_2) \times 2n$, if $(m_1+m_2) > (m_3+m_3)$, or $(m_3+m_4) \times 2n$, if $(m_3+m_4) > (m_1+m_2)$.

In some implementations, the process includes outputting the single composite output frame to a single video input port of a downstream video image processor.

In some implementations, the single video input port of the downstream video image processor is a high-definition (HD) video input port or an ultra-HD (UHD) video input port.

In some implementations, the process also includes receiving a next set of input image frames associated with the video signal inputs and forming the next single composite output frame containing the image data of the next set of input image frames.

In some implementations, the set of input image frames are HD video image frames and the single composite output frame is an UHD video image frame.

In another aspect, an integrated circuit (IC) chip for multiplexing a set of video signal inputs captured by a set of cameras in a panoramic imaging system into a single video signal output is disclosed. This IC chip includes a set of video input buffers configured to receive the set of video signal inputs; a memory controller coupled to the set of video input buffers and configured to write the set of video signal inputs into a memory, a video output buffer coupled to the memory controller and configured to control a process of multiplexing the set of video signal inputs into a single video signal output; and a video output interface coupled to the video output buffer and configured to output the single video signal output to a downstream video image processor for further processing.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

Figure 1:
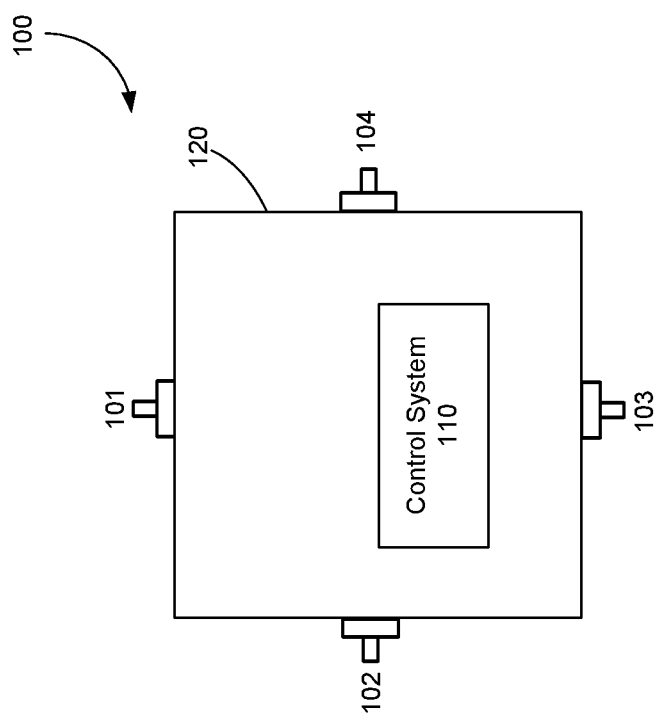
FIG. 1 is a schematic top view of an example panoramic imaging system in accordance with some embodiments described herein.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Described herein are systems and techniques for multiplexing a set of video signal inputs captured by a set of cameras in a panoramic imaging system into a single video signal output which can be subsequently output to a single video input port of a downstream video image processor. The proposed systems and techniques provide a solution for interfacing multiple channels of high-definition videos captured by the set of cameras of the panoramic imaging system with a limited number of available video input ports of a downstream video image processor of the panoramic imaging system, such as an accelerated processing unit (APU) for post-processing.

In one aspect, a process of multiplexing a set of video signal inputs captured by a set of cameras in a panoramic imaging system into a single video signal output is disclosed. This process starts by receiving a set of input image frames associated with the set of video signal inputs and then temporarily storing the set of input image frames in a memory. Next, for a first pair of image frames in the set of input image frames, the process iteratively processes each line in the first pair of image frames to construct a first portion of a video signal output frame. Next, for a second pair of image frames in the set of input image frames, the process iteratively processes each line in the second pair of image frames to construct a second portion of the video signal output frame. The process then combines the first portion of the video signal output frame and the second portion of the video signal output frame to form a single composite output frame containing the image data of the set of input image frames.

In another aspect, an integrated circuit (IC) chip for multiplexing a set of video signal inputs captured by a set of cameras in a panoramic imaging system into a single video signal output is disclosed. This IC chip includes a set of video input buffers configured to receive the set of video signal inputs; a memory controller coupled to the set of video input buffers and configured to write the set of video signal inputs into a memory; a video output buffer coupled to the memory controller and configured to control a process of multiplexing the set of video signal inputs into a single video signal output; and a video output interface coupled to the video output buffer and configured to output the single video signal output to a downstream video image processor for further processing.

FIG. 1 is a schematic top view of an example panoramic imaging system in accordance with some embodiments described herein. Not all of the depicted components may be used, however, and one or more implementations may include additional components not shown in the figure. Variations in the arrangement and type of the components may be made without departing from the scope of the subject technology. Additional components, different components, or fewer components may be provided.

As shown in FIG. 1, panoramic imaging system 100 of FIG. 1 includes four cameras 101-104, a control system 110, and housing 120. Each of four cameras 101-104 may be a digital camera. In some aspects, each of cameras 101-104 may include a wide-angle lens (e.g., fisheye lens) to capture image data. The horizontal angle of view of a wide-angle lens may be greater than 180 degrees and the vertical angle of view of a wide-angle lens may be greater than 180 degrees. FIG. 1 shows cameras 101-104 are distributed evenly across on a frame of housing 120, for example, on four sides of the frame having a rectangular shape. Each of cameras 101-104 may face a ⅛ of a 360° field. It can be appreciated that cameras 101-104 may be distributed in any other arrangement and each of cameras 101-104 may face any portion of a 360° field. Furthermore, panoramic imaging system 100 may include a greater or a fewer number of cameras than the eight cameras shown in FIG. 1. For example, panoramic imaging system 100 may include 2, 3, 6, 8, 10, or 12 cameras.

The control system 110 may include one or more electronic circuitries, such as a system on chip (SOC) with a field-programmable gate array (FPGA), Accelerated Processing Unit (APU) and peripheral electronic circuitries, for processing the image data captured by cameras 101-104 to produce wide to entire 360° panoramas, including both still images and movies. It can now be appreciated that outputs of panoramic imaging system 100 may be panoramas stitched from a set of original images captured by cameras 101-104.

Cameras 101-104 and the control system 110 may be enclosed in housing 120, such as a protective housing to reduce environmental effects on the components. In some embodiments, the protective housing is waterproof, dustproof, shockproof, freeze-proof, or any combination thereof. In some aspects, housing 120 may include one or more mechanical parts for mounting, housing and/or moving the cameras 101-104 and/or other optical components. Furthermore, in some embodiments, cameras 101-104 can be reversibly coupled to or detached from the remaining system, such that an end user may select different models of cameras 101-104 to be used with panoramic imaging system 100 according to particular needs or preferences.

It can be appreciated that a variety of embodiments of cameras 101-104 may be employed. These embodiments may have different numbers and/or arrangements of cameras than cameras 101-104, but a common feature may be that each camera's field of view overlaps with that of at least one other camera, thereby enabling panoramic imaging system 100 to capture a total field of view according to the design.

Those of ordinary skills in the art upon reading the present disclosure should become aware of how a panoramic imaging system according to the present disclosure can be designed to satisfy particular needs. Particularly, skilled persons in the art would follow the guidance provided by the present disclosure to select a suitable number of cameras with reasonable fields of view and arrange the set of cameras such that neighboring cameras' fields of view have reasonable overlap that enables the system to cover a desirable total field and reliably process image information in the overlapping field to produce panoramas.

Figure 2:
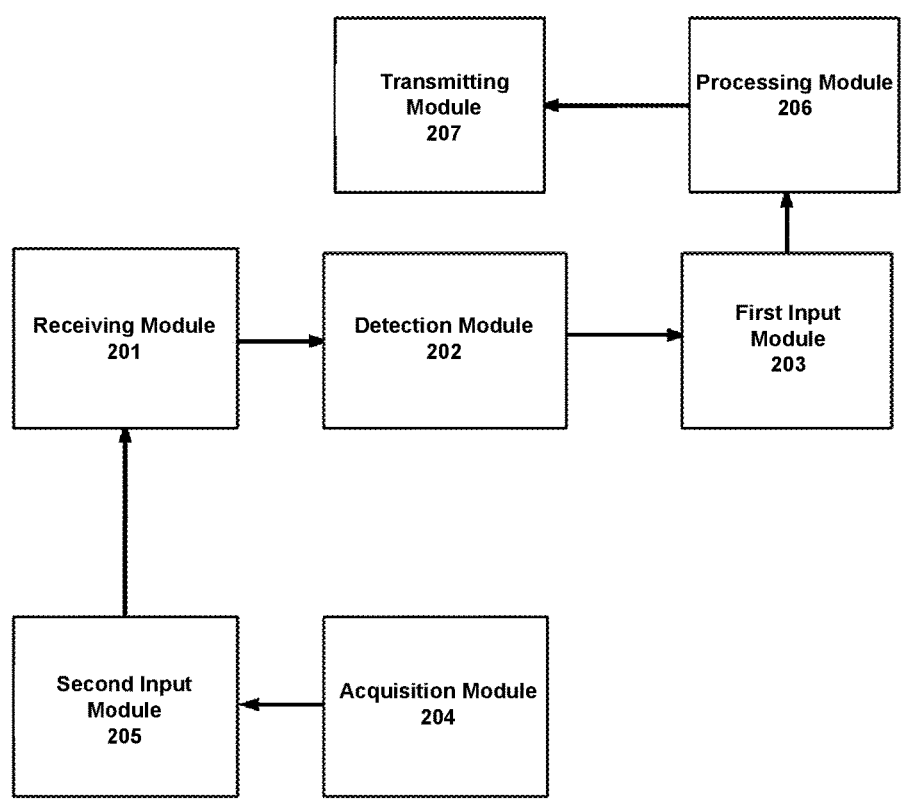
FIG. 2 illustrates a block diagram of an exemplary implementation of the panoramic imaging system described in FIG. 1 in accordance with some embodiments described herein.

FIG. 2 illustrates a block diagram of an exemplary implementation of the panoramic imaging system 100 described in FIG. 1 in accordance with some embodiments described herein. Not all of the depicted components may be used, however, and one or more implementations may include additional components not shown in the figure. Variations in the arrangement and type of the components may be made without departing from the scope of the subject technology. Additional components, different components, or fewer components may be provided.

As shown in FIG. 2, panoramic imaging system 100 includes receiving module 201, detection module 202, first input module 203, acquisition module 204, second input module 205, processing module 206, and transmitting module 207.

Receiving module 201 may receive image or video data captured by the multiple cameras in a YUV format. Detection module 202 may detect a signal format of the received image or video data by receiving module 201. The signal format of the image or video data may include resolution, pixel clock, line frequency information, and/or field frequency information. First input module 203 may output the detected image data to a memory unit (not shown in FIG. 2), such as a double date rate (DDR) memory unit. The detected image data may be processed at first input module 203, and the processed image data can be sent to processing unit 206 for further processing. The processing at processing unit 206 may include projection and image stitching, or distortion correction to produce 360-degree panoramic image and/or video. Processing unit 206 may be implemented as an accelerated processing unit (APU), a CPU, a micro-controller or other types of microprocessors. In some embodiments, receiving module 201, detection module 202 and first input module 203 may be collective implemented by an FPGA or one or more application specific integrated circuits (ASICs).

Acquisition module 204 may capture panoramic image or video data, such as 360-degree panoramic image or video data, using a plurality of cameras, such as the set of cameras 101-104 shown in system 100 of FIG. 1. In some aspects, a horizontal angle of view of each of the plurality of cameras capturing the 360-degree panoramic image data is 360 degrees divided by the number of the plurality of cameras (e.g., N) and a vertical angle of view of each of the plurality of cameras capturing the 360-degree panoramic image or video data is 360 degree divided by the number of the plurality of cameras.

In some aspects, when N>6, each of the plurality of cameras may include a wide-angle lens; when N>8, each of the plurality of cameras may include a regular (e.g., narrow-angle) lens; and when N<=6, each of the plurality of cameras may include a fisheye lens. In some aspects, when N=>8, each of the plurality of cameras may include a regular (e.g., narrow-angle) lens to capture an image without distortion, therefore distortion correction may not be required. In some aspects, when N<=8, each of the plurality of cameras may include a fisheye lens, and distortion may exist in the captured image, therefore distortion correction may be required.

Second input module 205 may output the 360-degree panoramic image data to a FPGA. Processing module 206 may include an encoding mechanism configured to encode the 360-degree panoramic image or video data using H264 standard. Transmitting module 207 may transmit the processed image or video data from processing module 205 to a client device.

Figure 3:
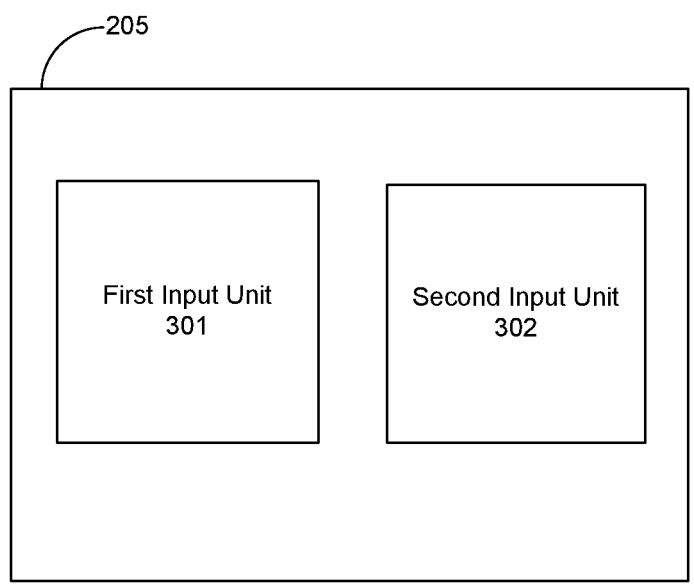
FIG. 3 illustrates a block diagram of an exemplary implementation of the second input module in FIG. 2 in accordance with some embodiments described herein.

FIG. 3 illustrates a block diagram of an exemplary implementation of second input module 205 in FIG. 2 in accordance with some embodiments described herein. Not all of the depicted components may be used, however, and one or more implementations may include additional components not shown in the figure. Variations in the arrangement and type of the components may be made without departing from the scope of the subject technology. Additional components, different components, or fewer components may be provided.

As shown in FIG. 3, second input module 205 may include first input unit 301, and second input unit 302. In some aspects, first input unit 301 may receive the 360-degree panoramic image or video data from acquisition module 204 described in FIG. 2 in YUV data format and transmit the 360-degree panoramic image or video data through a parallel YUV data interface to the FPGA. In some aspects, second input unit 302 may receive the 360-degree panoramic image or video data from acquisition module 204 in MIPI data format and transmit the 360-degree panoramic image or video data through a MIPI data interface and output to the FPGA through an interface chip which converts the MIPI data format to a parallel YUV data format.

Figure 4:
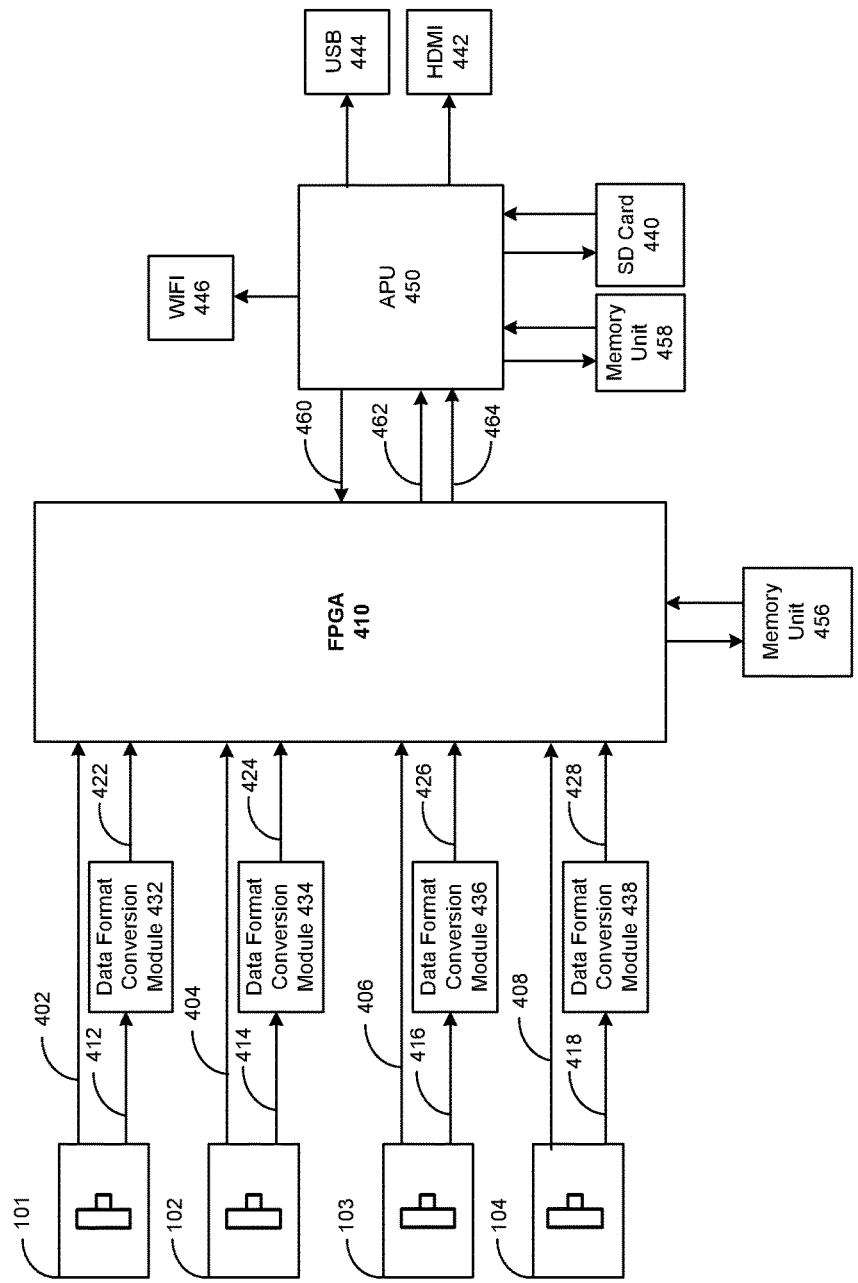
FIG. 4 illustrates a block diagram of an exemplary implementation of the panoramic imaging system described in FIG. 1 in accordance with some embodiments described herein.

FIG. 4 illustrates a block diagram of an exemplary implementation of the panoramic imaging system 100 described in FIG. 1 in accordance with some embodiments described herein. In some embodiments, panoramic imaging system 100 includes a FPGA chip configured to multiplex four channels of input video signals into a single channel of output video signal. Not all of the depicted components may be used, however, and one or more implementations may include additional components not shown in the figure. Variations in the arrangement and type of the components may be made without departing from the scope of the subject technology. Additional components, different components, or fewer components may be provided.

As shown in FIG. 4, panoramic imaging system 100 includes cameras 101, 102, 103 and 104, FPGA 410, APU 450, memory units 456 and 458, SD card 440, WIFI module 446, USB module 444, and HDMI module 442. In particular embodiments, FPGA 410 is configured to multiplex four channels of input video signals from cameras 101, 102, 103, and 104 into a single channel of output video signal which is subsequently input into APU 450. An exemplary implementation of FPGA 410 is provided below in conjunction with FIG. 5.

In one or more implementations, one or more of cameras 101, 102, 103 and 104 may simultaneously establish connections with FPGA 410. As shown in FIG. 4, the output from each of the cameras 101-104 may be coupled to FPGA 410 using two different connection options. More specifically, the output of camera 101 may be coupled to FPGA 410 through a direct connection 402. Alternatively, the output of camera 101 may be coupled to FPGA 410 by a path comprising a first connection 412 between the output of camera 101 and a data conversion module 432 and a second connection 422 between data conversion module 432 and FPGA 410. Similarly, the output of camera 102 may be coupled to FPGA 410 through a direct connection 404. Alternatively, the output of camera 102 may be coupled to FPGA 410 by a path comprising a first connection 414 between the output of camera 102 and a data conversion module 434 and a second connection 424 between data conversion module 434 and FPGA 410. Similarly, the output of camera 103 may be coupled to FPGA 410 through a direct connection 406. Alternatively, the output of camera 103 may be coupled to FPGA 410 by a path comprising a first connection 416 between the output of camera 103 and a data conversion module 436 and a second connection 426 between data conversion module 436 and FPGA 410. Finally, the output of camera 104 may be coupled to FPGA 410 through a direct connection 408. Alternatively, the output of camera 104 may be coupled to FPGA 410 by a path comprising a first connection 418 between the output of camera 104 and a data conversion module 438 and a second connection 428 between data conversion module 438 and FPGA 410.

In some embodiments, each of the connections 402, 404, 406, and 408 includes a parallel YUV data connection. This connection option may be used when the output data from a given camera 101, 102, 103, or 104 is already in YUV data format. In some embodiments, each of the connections 422, 424, 426, and 428 includes a parallel YUV data connection, and each of the connections 412, 414, 416, and 418 includes a MIPI data connection. Moreover, each of the data conversion modules 432, 434, 436 and 438 is configured to convert an input data from MIPI data format to parallel YUV data format. This alternative connection option may be used when the output data from a given camera 101, 102, 103, or 104 is in MIPI data format.

In some embodiments, FPGA 410 is configured to receive four input channels of video signals from the cameras 101-104, wherein each of the video signals is a high-definition (HD) video signal at 1280×720p, 1920×1080p or other high resolutions, and FPGA 410 is further configured to combine the four channels of HD video signals into a single ultra-high-definition (UHD) video signal. In these embodiments, the single channel of the UHD video output from FPGA 410 may be used to access an UHD input port of APU 450, such as a 4K×2K UHD input port for subsequent video processing. In other embodiments, FPGA 410 is configured to receive four input channels of standard definition (SD) video signals, and subsequently combine the four channels of SD video signals into a single HD or UHD video signal, which is then output to a single input port of APU 450 for subsequent video processing.

As illustrated in FIG. 4, FPGA 410 is connected to a memory unit 456, such as a DDR chip 456. In some embodiments, while multiplexing multiple channels of input video signals, FPGA 410 may use memory unit 456 as a temporary storage. In some implementations, FPGA 410 may execute instructions that are stored on FPGA 410 itself, such as on one or more integrated circuits within FPGA 410. In other implementations, FPGA 410 may execute instructions that are stored on memory unit 456. While the above discussion primarily refers to FPGA 410 that executes instructions, some implementations are performed by one or more integrated circuits, for example, application specific integrated circuits (ASICs). In some aspects, some implementations may be performed by one or more processors that execute instructions.

APU 450 may establish a connection 460 with FPGA 410. Connection 460 may include an I2C connection, to allow easy communication between components which reside on the same circuit board. FPGA 410 may establish one or more connections 462 and 464 with APU 450. Connections 462 and 464 may include one or more video data connections. In some embodiments, APU 450 includes only a single video input port and hence connections 462 and 464 become a signal connection. In other embodiments, APU 450 includes two video input ports and hence connections 462 and 464 can include two connections.

In some embodiments, panoramic imaging system 100 may transmit the processed panoramic image and video data from APU 450 to a downstream computing device (not shown) for storage and playback via a Universal Serial Bus (USB) interface 444, e.g., which can be a USB 3.0 interface. In some other embodiments, panoramic imaging system 100 may transmit the processed panoramic image and video data from APU 450 to the downstream computing device for playback via a High-Definition Multimedia Interface (HDMI). In some embodiments, panoramic imaging system 100 may output the processed panoramic image and video data from APU 450 to be stored in a SD card 440 on panoramic imaging system 100 or to a memory unit 458, such as a DDR chip but different from the DDR chip 456. Furthermore, panoramic imaging system 100 may transmit the processed panoramic image and video data from APU 450 to a wireless access point and a smart device through WIFI 446.

Figure 5:
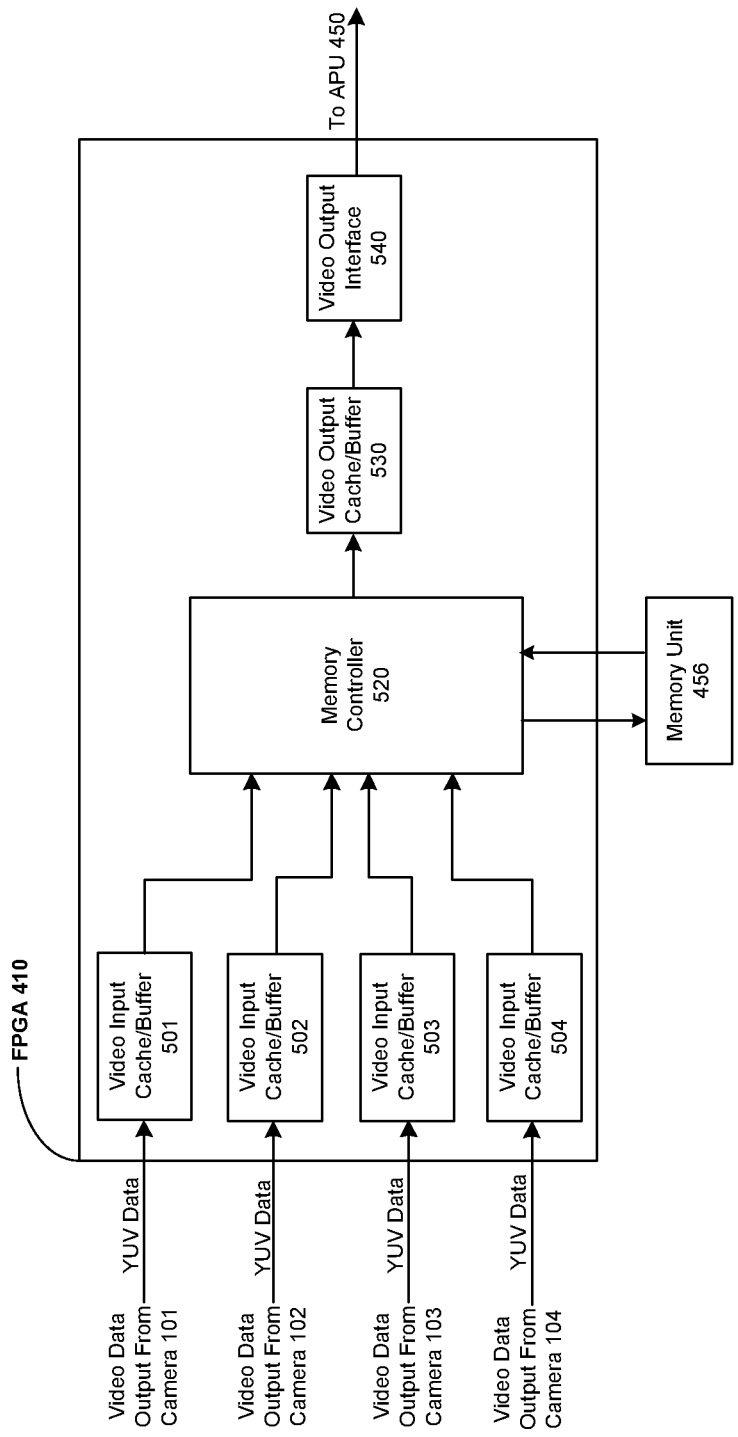
FIG. 5 illustrates a block diagram of an exemplary implementation of the FPGA described in FIG. 4 in accordance with some embodiments described herein.

FIG. 5 illustrates a block diagram of an exemplary implementation of FPGA 410 described in FIG. 4 in accordance with some embodiments described herein. Not all of the depicted components shown in FIG. 5 may be used, however, and one or more implementations may include additional components not shown in the figure. Variations in the arrangement and type of the components may be made without departing from the scope of the subject technology. Additional components, different components, or fewer components may be provided.

As shown in FIG. 5, FPGA 410 includes four input ports for receiving four channels of video signals captured by four cameras 101, 102, 103, and 104. In some embodiments, the four channels of video signals are HD video signals at 1280×720p, 1920×1080p or other high resolutions. In the embodiment shown, the input video signal in each of the four channels is in parallel YUV data format as it is transmitted from the corresponding camera to the corresponding input port on FPGA 410. However, the input video signals can be in a data format other than the YUV data format.

Also shown in FIG. 5, the input interface of FPGA 410 includes a set of video input caches/buffers 501, 502, 503, and 504 configured to receive the four channels of video signal outputs from cameras 101, 102, 103, and 104, respectively. FPGA 410 also includes a memory controller 520 which controls memory transactions within memory unit 456 illustrated in FIG. 4. As illustrated in FIG. 5, the outputs of video input caches/buffers 501, 502, 503, and 504 are coupled to the respective inputs of memory controller 520. In the implementations where memory unit 456 is a DDR memory, memory controller 520 may be configured as a DDR memory controller.

FPGA 410 additionally includes a video signal output cache/buffer 530 which is coupled to the output of memory controller 520 and a video output interface 540 which is coupled to the output of video signal output cache/buffer 530. In some embodiments, video signal output cache/buffer 530 is used to control the process of synthesizing, e.g., using a multiplexing technique, the four input HD video signals into one UHD video signal. Video signal output cache/buffer 530 is also configured to output the synthesized UHD video signal to video output interface 540. In some embodiments, video output interface 540 is configured to output the synthesized UHD video signal to the downstream APU 450 described above in conjunction with FIG. 4.

Figure 6:
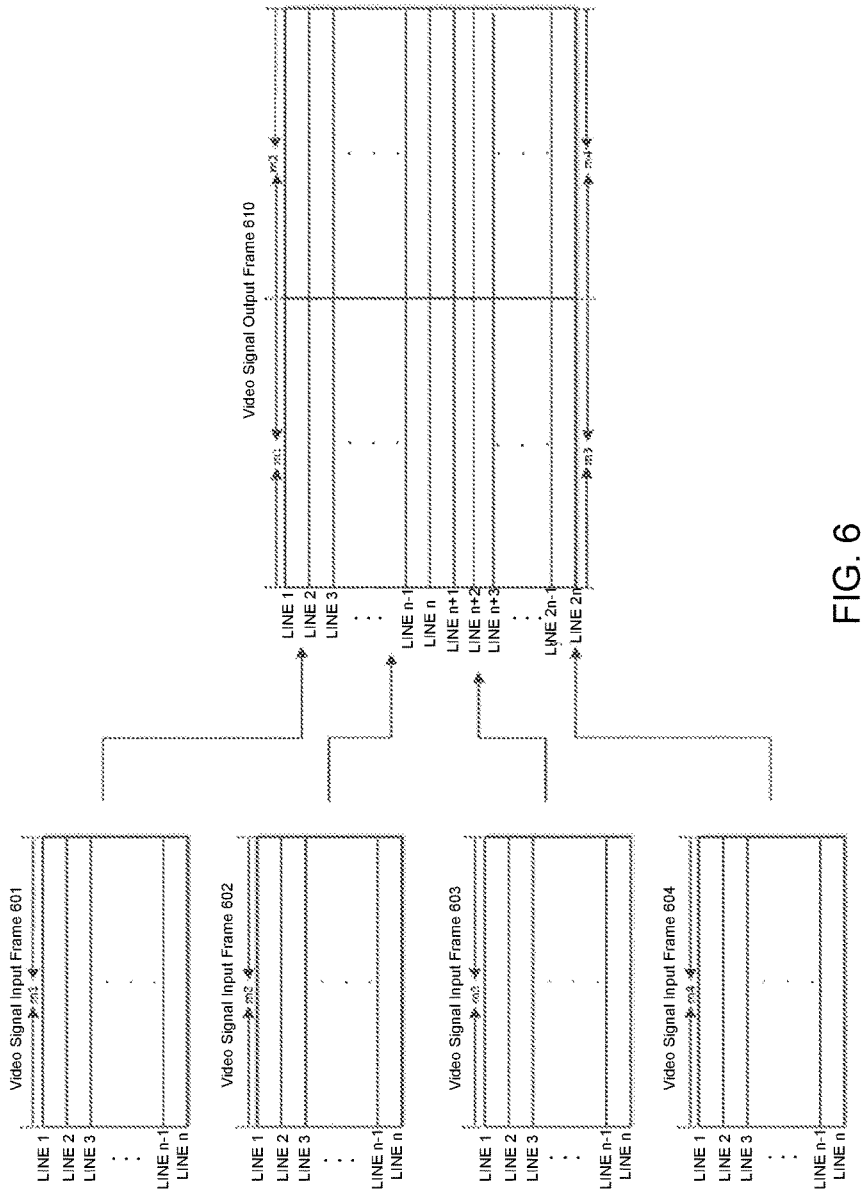
FIG. 6 illustrates a process of multiplexing four channels of video signal inputs into a single video signal output within the proposed FPGA in accordance with some embodiments described herein.

FIG. 6 illustrates a process 600 of multiplexing four channels of video signal inputs into a single video signal output within the proposed FPGA 410 in accordance with some embodiments described herein. The process 600 should be understood in conjunction with the exemplary FPGA 410 described in FIG. 5.

As shown in FIG. 6, the multiplexing operation 600 is performed on each image frame of the input image frames 601, 602, 603, and 604 which arrive at the respective video input caches/buffers 501-504 of FPGA 410 substantially simultaneously. Each image frame is shown to have a size of mi×n, wherein n is number of rows, or lines, or the "height" of the image frame and mi is the number of columns or the "width" of the image frame 60$i$ ($i$=1, 2, 3, 4). In one embodiment, the video signal inputs are HD video signals at 1280×720 resolutions, and hence n=1280 and mi=720. In another embodiment, the video signal inputs are HD video signals at 1920×1080 resolutions, and hencen=1920 and mi=1080. Note that the number of columns in each of the image frames mi may be different (e.g., mi 0 m2) without departing from the scope of the disclosed technology. Moreover, while FIG. 6 shows all four input image frames have the same number of rows n, the number of rows of a one image frame in the frames 601-604 may be different from another image frame in the frames 601-604 without departing from the scope of the disclosed technology.

In some embodiments, after passing through the video input caches 501-504, input image frames 601, 602, 603, and 604 are temporarily stored into memory unit 456, such as a DDR memory, under the control of memory controller 520 of FPGA 410. The process 600 next reads the first line of the input frame 601 from the memory unit 456 and subsequently outputs the data, for example, to the video output cache 530. Next, process 600 reads the first line of the input frame 602 from the memory unit 456 and subsequently outputs the data, for example, to the video output cache/buffer 530. As can be seen in FIG. 6, the output first line of frame 602 is combined with the output first line of frame 601 to form a single first line of size $m_1+m_2$.

The above steps are then repeated for frames 601 and 602 alternately and sequentially for the next lines j=2, . . . , n, i.e., reading and outputting line j from frame 601; reading and outputting line j from frame 602; and combining line j of frame 601 and line j of frame 602 in the video output cache 530 to form a new line j of size $m_1+m_2$, until line n of the two frames are processed. As a result, a first half of a new frame 610 of size $(m_1+m_2)\times n$ is constructed and temporarily stored in video output cache 530, which is shown as the top half of video signal output frame 610.

Next, process 600 reads the first line of the input frame 603 from the memory unit 456 and subsequently outputs the data, for example, to the video output cache/buffer 530. The process 600 then reads the first line of the input frame 604 from the memory unit 456 and subsequently outputs the data, for example, to the video output cache/buffer 530. As can be seen in FIG. 6, the output first line of frame 603 is combined with the output first line of frame 604 to form a single line n+1 of size m3+ma in the video signal output frame 610.

Similarly, the above steps are then repeated for frames 603 and 604 alternately and sequentially for the next lines j=2, . . . , n, i.e., reading and outputting line j from frame 603; reading and outputting line j from frame 604; and combining line j of frame 603 and line j of frame 604 in the video output cache/buffer 530 to form a new line j of size $m_3+m_4$, until line n of the two frames are processed. As a result, a second half of the new frame 610 of size $(m_3+m_4) \times n$ is constructed and temporarily stored in video output cache/buffer 530, which is shown as the bottom half of video signal output frame 610. At the same time, a single new output frame 610 is constructed and temporarily stored in the video output cache/buffer 530. It can be observed that, if the four video signal inputs are HD video signals at 1280×720p, 1920× 1080p or other high resolutions, the composite video output frame 610 can have a UHD resolution, e.g., at a 4K resolution. Note that the above described process 600 is repeated for sequential sets of input frames 601, 602, 603, and 604 which compose of an input video stream captured by the set of cameras 101-104.

Note that the new frame 610 can have a size of $(m_1+m_2) \times 2n$, if $(m_1+m_2) > (m_3+m_4)$ or size of $(m_3+m_4) \times 2n$, if $(m_3+m_4) > (m_1+m_2)$. In the embodiment shown in FIG. 6, $m_1=m_3$ and $m_2=m_4$, and hence the size of frame 610 equals $(m_1+m_2) \times 2n = (m_3+m_4) \times 2n$. However, it is possible that the input frames have different column sizes, i.e., $m_1 \neq m_3$ and/or $m_2 \neq m_4$. In such cases, the size of the output frame 610 may have a new size of $(m_k+m_l) \times 2n$, wherein k is the bigger value between $m_1$ and $m_3$ while l is the bigger value between $m_2$ and $m_4$. Moreover, between input frames 601 and 603, for the frame with a smaller column size (e.g., if $m_3<m_1$), it may be necessary to add extra spaces to the end of lines corresponding to the smaller frame in the output frame 610 so that they are equal to the column size of the bigger frame. Similarly, between input frames 602 and 604, for the frame with a smaller column size (e.g., if $m_2<m_4$), it may be necessary to add extra spaces to the end of the lines corresponding to the smaller frame in the output frame 610 so that they are equal to the column size of the bigger frame. In some embodiments, the extra spaces used to make up the smaller frames may be filled with all 1s, all 0s, or random data. In the same token, if the input frames have different row sizes (e.g., if frame 601 has n rows, frame 602 has n' rows, wherein n>n'), extra rows may be added in the output frame 610 after the last output row of an input frame with a smaller row size (e.g., frame 602) to match up with a corresponding input frame with a larger row size (e.g., frame 601).

Note that, because the four video signal inputs 601-604 are substantially equivalent, the particular order of frame processing described above in process 600 (i.e., 601 and 602 first and then 603 and 604 next) should be interpreted to be equally applicable to other combinations of the four input frames 601-604. For example, one embodiment can first combine and output frames 601 and 603 to frame 610, and then combine and output frames 602 and 604 to frame 610. As another example, the process can first combine and output frames 603 and 604 to frame 610, and then combine and output frames 601 and 602 to frame 610. These two examples and the one described in process 600 are among a plurality of obvious variations of combining the four input frames 601-604.

According to the exemplary video resolutions shown in FIG. 6, wherein the input frames are $m_i \times n$ (i=1, 2, 3, 4), wherein $m_1=m_3$, $m_2=m_4$, the composite output frame 601 has a frame width of $m_1+m_2$, and a height of 2n. Denote the pixel clock rate of FPGA 410 as f. Assume the downstream APU (e.g., APU 450 in FIG. 4) includes a video input port that supports a maximum resolution of M×N, and the maximum supported pixel clock rate F. Therefore, the following requirements may be satisfied: $m_1+m_2<=M$; $2n<=N$; and $f<=F$.

Figure 7:
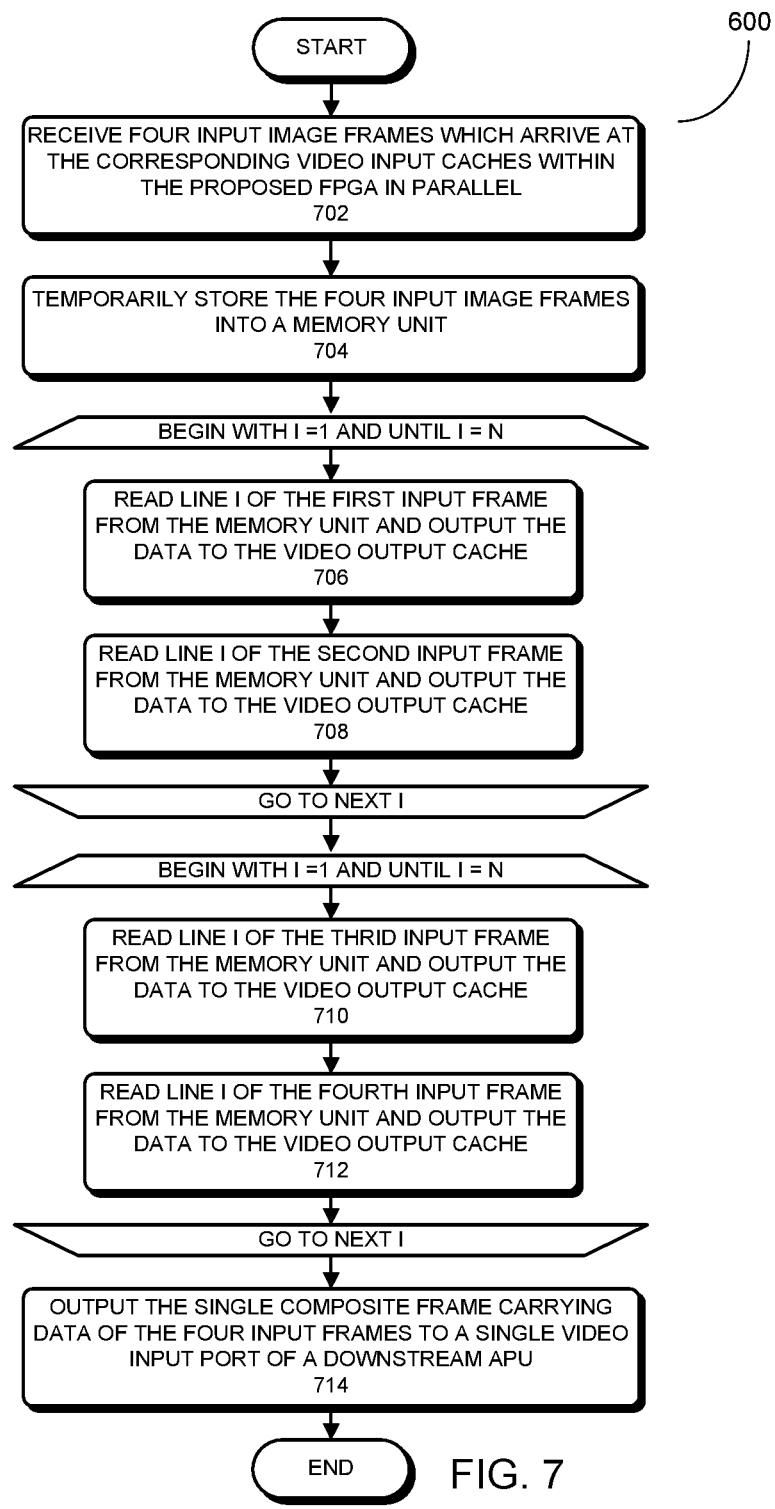
FIG. 7 presents a flowchart illustrating the process of multiplexing four video signal inputs into the single video signal output using the proposed FPGA in accordance with some embodiments described herein.

FIG. 7 presents a flowchart illustrating the process 600 of multiplexing four video signal inputs into the single video signal output using the proposed FPGA in accordance with some embodiments described herein.

The process begins by receiving four input image frames of the four video signals which arrive at the corresponding video input caches within the proposed FPGA in parallel (step 702). The process then temporarily stores the four input image frames into a memory unit, for example, under the control of the memory controller of the proposed FPGA (step 704). Note that this memory unit may be a memory unit separated from the proposed FPAG. The process next reads the first line (of image data) of the first input frame from the memory unit and subsequently outputs the data to the video output cache of the proposed FPGA (step 706). Next, the process reads the first line (of image data) of the second input frame from the memory unit and subsequently outputs the data to the video output cache of the proposed FPGA (step 708). The steps 706 and 708 are repeated for the first and second frames alternately and sequentially for all the lines j=2 . . . , n in the two frames. As a result, a first half of the video signal output frame is constructed and temporarily stored in video output cache.

The process next reads the first line (of image data) of the third input frame from the memory unit and subsequently outputs the data to the video output cache of the proposed FPGA (step 710). Next, the process reads the first line (of image data) of the fourth input frame from the memory unit and subsequently outputs the data to the video output cache of the proposed FPGA (step 712). The steps 710 and 712 are repeated for the third and fourth frames alternately and sequentially for all the lines j=2, . . . , n in these two frames. As a result, a second half of the video signal output frame is constructed and temporarily stored in video output cache. At the end of step 712, a single composite output frame is constructed and temporarily stored in the video output cache. The process next outputs the single composite frame carrying data of all four input frames from the proposed FPGA, for example, through a video output interface of the proposed FPGA, to a single video input port of a downstream APU (step 714).

Notably, while the embodiments described in conjunction with FIG. 4-7 are directed to multiplexing four video signal inputs captured by four panoramic cameras into a single video signal output using the proposed FPGA, the disclosed systems and techniques can be easily extended to panoramic systems having fewer or greater than 4 cameras. For example, for a panoramic system comprising 8 cameras, the proposed FPGA 410 can be expanded to receive the eight video signal inputs and configured to multiplex the eight video signal inputs into either one or two composite video signal outputs depending on the number of video input ports available on the downstream APU. For example, if the downstream APU has two video input ports, the proposed FPGA can be configured to multiplex input channels 1-4 into the first composite video signal output using the process described above in conjunction with FIGS. 6-7 and, in parallel, multiplex input channels 5-8 into the second composite video signal output using the same process.

Moreover, for a panoramic system having less than four, for example, three cameras, the proposed FPGA 410 can be modified to receive the three video signal inputs and configured to multiplex the three video signal inputs into a single composite video signal output. For example, the proposed FPGA can be configured to multiplex the three input channels using a process modified from the process described above in conjunction with FIGS. 6-7. In one embodiment, the modified image multiplexing process can multiplex the three input frames at the same time by alternately reading and outputting one line from each input frame and combining the three output lines from the three input frames into a single line in the output frame, and then repeat the modified process for the next line in each of the three input frames. Alternatively, another modified image multiplexing process can multiplex the first two input frames in the manner described above, and then simply read and combine the third input frame with the composite frame of the first two frames to construct the single output frame.

Figure 8:
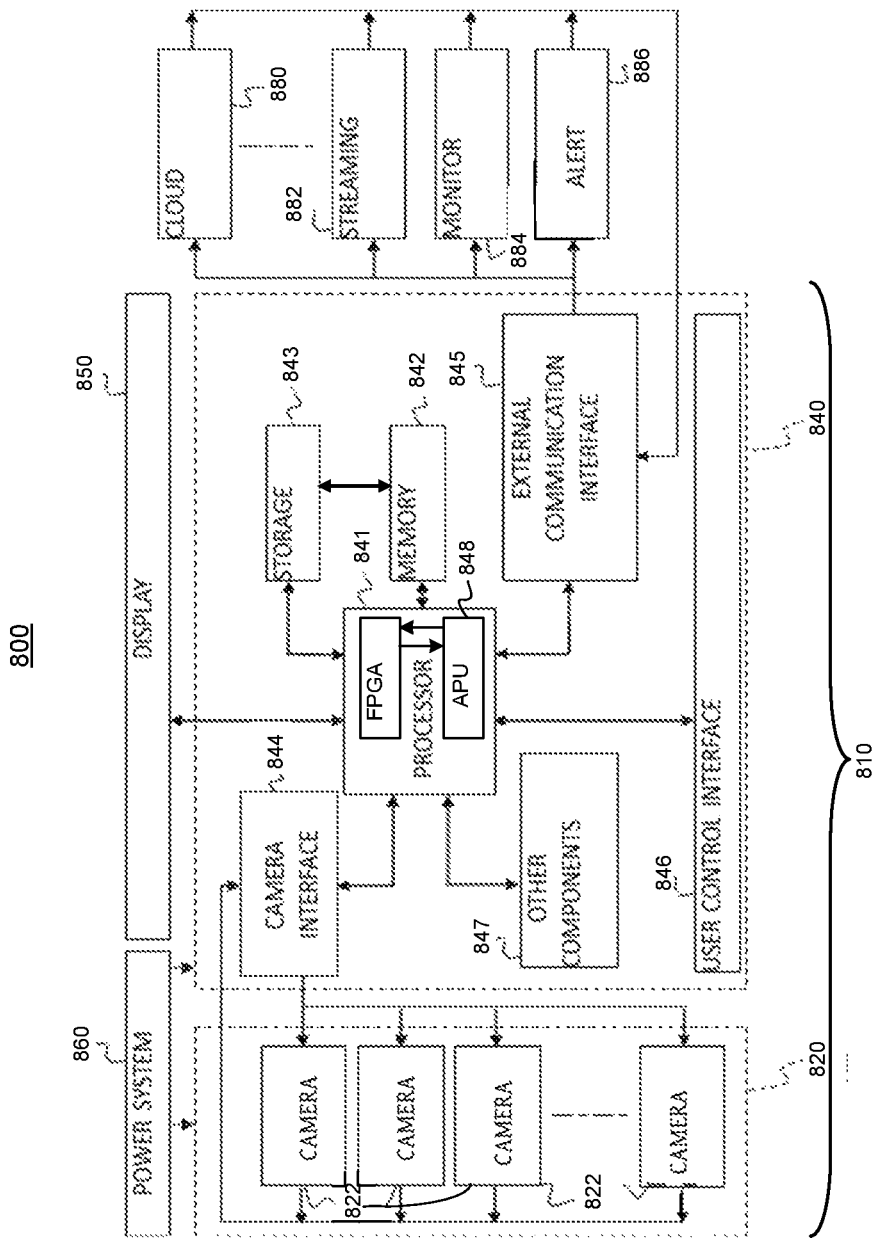
FIG. 8 conceptually illustrates an exemplary electronic system including a panoramic imaging system and various peripheral modules configured in an internet-enabled application environment with which some implementations of the subject technology can be implemented.

FIG. 8 conceptually illustrates an exemplary electronic system 800 including a panoramic imaging system 810 and various peripheral modules configured in an internet-enabled application environment with which some implementations of the subject technology can be implemented. Not all of the depicted components may be used, however, and one or more implementations may include additional components not shown in the figure. Variations in the arrangement and type of the components may be made without departing from the scope of the subject technology. Additional components, different components, or fewer components may be provided.

Exemplary panoramic imaging system 810 within exemplary panoramic imaging electronic system 800 may be implemented by panoramic imaging system 100 as described above with reference to FIG. 1. According to the present disclosure, the example panoramic imaging system 810 further includes an optical system 820 which includes a plurality of cameras 822, and a control system 840 that controls the functions of the optical system 820 and includes at least an image processing program to process image data output from optical system 820. The plurality of cameras 822 may be implemented by cameras 101-104 in system 100. However, the plurality of cameras 822 may include more cameras than cameras 101-104 in system 100.

Control system 840 described in FIG. 8 may be used to implement control system 110 described in FIG. 1. Particularly, the control system 840 includes at least a processor 841, a memory 842, a storage device 843, a camera interface 844, an external communication interface 845, and a user control interface 846. The control system 840 can be a general-purpose computer system such as a Personal Computer (PC), or preferably a custom-designed computing system. Particularly in some embodiments, the control system 840 is a system on chip (SOC); that is, an integrated circuit (IC) integrates all components and functions of the control system 840 into a single chip, which makes the present panoramic imaging system 810 portable and electronically durable as a mobile device. In some embodiments, the control system 840 may be located internally within a same housing where the optical system 820 is located. Alternatively, in other embodiments, the control system 840 is separated from the optical system 820 to allow end users' selection of different models of an optical system 820 to be used with the control system 840.

The storage device 843 is preloaded with at least the image processing programs of the present disclosure, including stereoscopic video image capturing and 3D video image playback programs. The stereoscopic video image capturing programs may include real-time parallax vector field generation programs described in more detail below. Other customer-designed software programs may be preloaded during manufacture or downloaded by end users after they purchase the system. Exemplary customer-designed software programs to be used with the present panoramic imaging system include but are not limited to software that further processes panoramic images or videos according to an end user's needs, such as 3D modeling, object tracking, and virtual reality programs. Further exemplary customer-designed software includes but is not limited to image editing programs that allow users to adjust color, illumination, contrast or other effects in a panoramic image, or film editing programs that allow users to select favorite views from a panoramic video to make normal videos.

The electronic circuitry in the processor 841 carries out instructions of the various algorithms. Thus, the various software programs, stored on the storage device 843 and executed in the memory 842 by the processor 841, direct the control system 840 to act in concert with the optical system 820 to perform various functions, which include but are not limited to receiving commands from an end user or an external device or service 880, 882, 884 and 886, defining the precise geometry of the cameras 822, commanding the cameras 822 to capture raw image data, tagging and storing raw data in a local storage device 843 and/or commuting raw data to an external device or service 880, 882, 884 and 886, multiplexing multiple channels of video signal inputs from cameras 822 into a single video signal output to allow multiple HD resolution video inputs from cameras 822 to interface with limited input ports of an APU 848 within processor 841, presenting generated panoramas on a local display 850 and/or communicating generated panoramas to be stored or presented on an external device or service 880, 882, 884 and 886.

The processor 841 of the present disclosure can be any integrated circuit (IC) that is designed to execute instructions by performing arithmetic, logical, control and input/output (I/O) operations specified by algorithms. Particularly, the processor can be a central processing unit (CPU) and preferably a microprocessor that is contained on a single IC chip. In some embodiments, the control system 840 may employ a multi-core processor that has two or more CPUs or array processors that have multiple processors operating in parallel. In some embodiments, the processor 841 is an application specific integrated circuit (ASIC) that is designed for a particular use rather than for general purpose use. Particularly, in some embodiments, the processor 841 is a digital signal processor (DSP) designed for digital signal processing. More particularly, in some embodiments, the processor 841 is an on-chip image processor, specialized for image processing in a portable camera system. In some embodiments, the control system 840 includes a graphic processing unit (GPU), which has a massively parallel architecture consisting of thousands of smaller, more efficient cores designed for handling multiple tasks simultaneously. Particularly, in some embodiments, the control system

840 may implement GPU-accelerated computing, which offloads compute-intensive portions of an algorithm to the GPU while keeping the remainder of the algorithm to run on the CPU.

In particular embodiments, processor 841 of the present disclosure includes the proposed FPGA 410 described in conjunction with FIGS. 4-7. Hence, the FPGA 410 within processor 841 may be configured to multiplex multiple channels of video signal inputs from cameras 822 into a single video signal output to allow multiple HD resolution video inputs from cameras 822 to interface with limited input ports of APU 848 within processor 841.

The memory 842 and the storage 843 of the present disclosure can be any type of primary or secondary memory device compatible with the industry standard, such as read-only memory (ROM), random access memory (RAM), electrically erasable programmable read-only memory (EEPROM), and flash memory. In the embodiments where the control system 240 is a single chip system, the memory 842 and storage 843 blocks are also integrated on-chip with the processor 841 as well as other peripherals and interfaces. In some embodiments, the on-chip memory components may be extended by having one or more external solid-state storage media, such a secure digital (SD) memory card or a USB flash drive, reversibly connected to the imaging system. For example, the various memory units include instructions for removing an obstructing object in a panoramic image. From these various memory units, the processor 841 retrieves instructions to execute and data to process in order to execute the processes of some implementations.

The camera interface 844 of the present disclosure can be any form of command and data interface usable with a camera 842, such as a digital. Exemplary embodiments include USB, FireWire and any other interface for command and data transfer that may be commercially available. Additionally, it is preferred, although not required, that the optical system 820 be equipped with a single digital control line that would allow a single digital signal to command all the cameras 822 simultaneously to capture an image of a scene and to acquire positional signals of the camera body.

The external communication interface 845 of the present disclosure can be any data communication interface, and may employ a wired, fiber-optic, wireless, or another method for connection with an external device or service 880, 882, 884 and 886. Ethernet, wireless-Ethernet, Bluetooth, USB, FireWire, USART, SPI are exemplary industry standards. In some embodiments, where the control system 840 is a single chip system, the external communication interface 845 is integrated on-chip with the processor 841 as well as other peripherals and interfaces.

The user control interface 846 of the present disclosure can be any design or mode that allows effective control and operation of the panoramic imaging system from the user end, while the system feeds back information that aids the user's decision making process. Exemplary embodiments include but are not limited to graphical user interfaces that allow users to operate the system through direct manipulation of graphical icons and visual indicators on a control panel or a screen, touchscreens that accept users' input by touch of fingers or a stylus, voice interfaces which accept users' input as verbal commands and outputs via generating voice prompts, gestural control, or a combination of the aforementioned modes of interface.

Control system 840 of the present disclosure may further include other components 847 that facilitate its function. For example, control system 840 may optionally include a location and orientation sensor that could determine the location and orientation of the panoramic imaging system. Exemplary embodiments include a global positioning system (GPS) that can be used to record geographic positions where image data are taken, and a digital magnetic compass system that can determine the orientation of camera system in relation to the magnetic north. Control system 840 may optionally be equipped with a timing source, such as an oscillator or a phase-locked loop, which can be used to schedule automatic image capture, to time stamp image data, and to synchronize actions of multiple cameras to capture near simultaneous images in order to reduce error in image processing. Control system 840 may optionally be equipped with a light sensor for environmental light conditions, so that control system 840 can automatically adjust hardware and/or software parameters of the system.

In some embodiments, the present electronic system 800 is further equipped with an internal power system 860 such as a battery or solar panel that supplies the electrical power. In other embodiments, electronic system 800 is supported by an external power source. In some embodiments, electronic system 800 is further equipped with a display 850, such that panoramic photos may be presented to a user instantly after image capture, and panoramic videos may be displayed to a user in real time as the scenes are being filmed.

In some embodiments, the present electronic system 800 may be used in conjunction with an external device for displaying and/or editing panoramas generated. Particularly, the external device can be any electronic device with a display and loaded with software or applications for displaying and editing panoramic images and videos created by the present system. In some embodiments, the external device can be smart phones, tablets, laptops or other devices programmed to receive, display, edit and/or transfer the panoramic images and videos. In some embodiments, the present panoramic imaging system may be used in conjunction with an external service, such as Cloud computing and storage 880, online video streaming and file sharing 882, remote surveillance 884, and alert 886 for home and public security.

While this patent document contains many specifics, these should not be construed as limitations on the scope of any invention or of what may be claimed, but rather as descriptions of features that may be specific to particular embodiments of particular inventions. Certain features that are described in this patent document and attached appendix in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document and attached appendix should not be understood as requiring such separation in all embodiments.

Only a few implementations and examples are described and other implementations, enhancements and variations can be made based on what is described and illustrated in this patent document.

What is claimed is:

1. A computer implemented method of multiplexing a set of video signal inputs captured by a set of cameras in a panoramic imaging system into a single video signal output, the method comprising:
disposing the set of cameras evenly across on a frame of a protective housing,
wherein one camera's field of view overlaps with that of at least one other camera, thereby enabling the panoramic imaging system to capture a total field of view, and
wherein a horizontal angle of view of each of the set of cameras capturing 360-degree panoramic image data is 360 degrees divided by the number of the set of cameras and a vertical angle of view of the each of the set of cameras capturing the 360-degree panoramic image data is the 360 degrees divided by the number of the set of cameras:
capturing the set of video signal inputs by the set of cameras to produce wide to entire 360-degree panoramas;
receiving, by a processor implemented by an application specific integrated circuit (ASIC), a set of input image frames associated with the set of video signal inputs;
temporarily storing the set of input image frames in a memory;
for a first pair of image frames in the set of input image frames, iteratively processing, by the processor, each line in the first pair of image frames to construct a first portion of a video signal output frame, the iteratively processing each line in the first pair of image frames to construct the first portion of the video signal output frame comprising the following steps:
reading, by the processor, lines of image data of a first image frame of the first pair of image frames from the memory unit;
outputting, by the processor, the read lines of image data of the first image frame to an output video buffer;
reading, by the processor, lines of image data of a second image frame of the first pair of image frames from the memory unit;
outputting, by the processor, the read lines of image data of the second image frame to the output video buffer; and
combining, by the processor, the read lines of image data of the first image frame with the read lines of image data of the second image frame in the video buffer horizontally to form one line of combined image data of the first portion of the video signal output frame;
for a second pair of image frames in the set of input image frames, iteratively processing, by the processor, each line in the second pair of image frames to construct a second portion of the video signal output frame, iteratively processing each line in the second pair of image frames to construct the second portion of the video signal output frame comprising the following steps:
reading, by the processor, lines of image data of a third image frame of the second pair of image frames from the memory unit;
outputting, by the processor, the read lines of image data of the third image frame to the output video buffer;
reading, by the processor, lines of image data of a fourth image frame of the second pair of image frames from the memory unit;
outputting, by the processor, the read lines of image data of the fourth image frame to the output video buffer; and
combining, by the processor, the read lines of image data of the third image frame with the read lines of image data of the fourth image frame in the video buffer horizontally to form one line of combined image data of the second portion of the video signal output frame,
wherein the sizes of the first pair of image frames are $m_1 \times n$ and $m_2 \times n$, respectively, and the sizes of the second pair of image frames are $m_3 \times n$ and $m_a \times n$, respectively, each of the $m_i$, $m_2$, $m_3$ and $m_a$ being at least 720; and
combining by the processor, the first portion of the video signal output frame and the second portion of the video signal output frame vertically to form a single composite output frame containing the image data of the set of input image frames, thereby providing a solution for multiplexing multiple channels of high-definition videos into a single input channel.

2. The computer implemented method of claim 1, wherein the lines of image data of the first image frame and the lines of image data of the second image frame have the same line number.

3. The computer implemented method of claim 1, wherein the lines of image data of the third image frame and the lines of image data of the fourth image frame have the same line number.

4. The computer implemented method of claim 1, wherein the size of the composite output frame is $(m_i+m_2) \times 2n$, if $(m_i+m_2) > (m_3+m_4)$, or $(m_3+m_a) \times 2n$, if $(m_3+m_a) > (m_i+m_2)$.

5. The computer implemented method of claim 1, wherein the method further comprises outputting the single composite output frame, by the processor, to a single video input port of a downstream video image processor.

6. The computer implemented method of claim 5, wherein the single video input port of the downstream video image processor is a high-definition (HD) video input port or an ultra-HD (UHD) video input port.

7. The computer implemented method of claim 1, wherein the method further comprises receiving, by the processor, a next set of input image frames associated with the video signal inputs and forming the next single composite output frame containing the image data of the next set of input image frames.

8. The computer implemented method of claim 1, wherein the set of input image frames are HD video image frames and the single composite output frame is an UHD video image frame.

9. A non-transitory computer-readable storage medium storing instructions that when executed by a computer cause the computer to perform a method for multiplexing a set of video signal inputs captured by a set of-cameras in a panoramic imaging system into a single video signal output, the method comprising:
disposing the set of cameras evenly across on a frame of a protective housing, wherein one camera's field of view overlaps with that of at least one other camera, thereby enabling the panoramic imaging system to capture a total field of view, and wherein a horizontal angle of view of each of the set of cameras capturing 360-degree panoramic image data is 360 degrees divided by the number of the set of cameras and a vertical angle of view of the each of the set of cameras capturing the 360-degree panoramic image data is the 360 degrees divided by the number of the set of cameras:

capturing the set of video signal inputs by the set of cameras to produce wide to entire 360-degree panoramas;

receiving, by a processor implemented by an application specific integrated circuit (ASIC), a set of input image frames associated with the set of video signal inputs;

temporarily storing the set of input image frames in a memory;

for a first pair of image frames in the set of input image frames, iteratively processing, by the processor, each line in the first pair of image frames to construct a first portion of a video signal output frame, the iteratively processing each line in the first pair of image frames to construct the first portion of the video signal output frame comprising the following steps:

reading, by the processor, lines of image data of a first image frame of the first pair of image frames from the memory unit;

outputting, by the processor, the read lines of image data of the first image frame to an output video buffer;

reading, by the processor, lines of image data of a second image frame of the first pair of image frames from the memory unit;

outputting, by the processor, the read lines of image data of the second image frame to the output video buffer; and combining, by the processor, the read lines of image data of the first image frame with the read lines of image data of the second image frame in the video buffer horizontally to form one line of combined image data of the first portion of the video signal output frame;

for a second pair of image frames in the set of input image frames, iteratively processing, by the processor, each line in the second pair of image frames to construct a second portion of the video signal output frame, iteratively processing each line in the second pair of image frames to construct the second portion of the video signal output frame comprising the following steps;

reading, by the processor, lines of image data of a third image frame of the second pair of image frames from the memory unit;

outputting, by the processor, the read lines of image data of the third image frame to the output video buffer;

reading, by the processor, lines of image data of a fourth image frame of the second pair of image frames from the memory unit;

outputting, by the processor, the read lines of image data of the fourth image frame to the output video buffer; and combining, by the processor, the read lines of image data of the third image frame with the read lines of image data of the fourth image frame in the video buffer horizontally to form one line of combined image data of the second portion of the video signal output frame, wherein the sizes of the first pair of image frames are mi×n and m2×n, respectively, and the sizes of the second pair of image frames are m3×n and ma×n, respectively, each of the mi, m2, m3 and ma being at least 720; and combining, by the processor, the first portion of the video signal output frame and the second portion of the video signal output frame vertically to form a single composite output frame containing the image data of the set of input image frames, thereby providing a solution for multiplexing multiple channels of high-definition videos into a single input channel.

10. The non-transitory computer-readable storage medium of claim 9, wherein the lines of image data of the first image frame and the lines of image data of the second image frame have the same line number.

11. The non-transitory computer-readable storage medium of claim 9, wherein the lines of image data of the third image frame and the lines of image data of the fourth image frame have the same line number.

12. The non-transitory computer-readable storage medium of claim 9, wherein the size of the composite output frame is (mi+m2)×2n, if (mi+m2)>(m3+m4), or (m3+ma)×2n, if (m3+ma)>(mi+m2).

13. The non-transitory computer-readable storage medium of claim 9, wherein the method further comprises outputting by the processor, the single composite output frame to a single video input port of a downstream video image processor.

14. The non-transitory computer-readable storage medium of claim 13, wherein the single video input port of the downstream video image processor is a high-definition (HD) video input port or an ultra-HD (UHD) video input port.

15. The non-transitory computer-readable storage medium of claim 9, wherein the method further comprises receiving, by the processor, a next set of input image frames associated with the video signal inputs and forming the next single composite output frame containing the image data of the next set of input image frames.

* * * * *